(12) United States Patent
Flores Sandoval et al.

(10) Patent No.: US 10,125,226 B2
(45) Date of Patent: Nov. 13, 2018

(54) SCALE-UP PROCESS OF BIFUNCTIONALIZED TRIBLOCK COPOLYMERS WITH SECONDARY AND TERTIARY AMINES, WITH APPLICATION IN DEWATERING AND DESALTING OF HEAVY CRUDE OILS

(71) Applicant: INSTITUTO MEXICANO DEL PETROLEO, Mexico City (MX)

(72) Inventors: Cesar Andres Flores Sandoval, Mexico City (MX); Eugenio Alejandro Flores Oropeza, Mexico City (MX); Alfonso Lopez Ortega, Mexico City (MX); Jose Gonzalo Hernandez Cortez, Mexico City (MX); Aristeo Estrada Buendia, Mexico City (MX); Laura Veronica Castro Sotelo, Mexico City (MX); Reyna Reyes Martinez, Mexico City (MX); Fernando Alvarez Ramirez, Mexico City (MX); Arquimedes Estrada Martinez, Mexico City (MX); Flavio Salvador Vazquez Moreno, Mexico City (MX)

(73) Assignee: INSTITUTO MEXICANO DEL PETROLEO, Mexico City (MX)

( * ) Notice: Subject to any disclaimer, the term of this patent is extended or adjusted under 35 U.S.C. 154(b) by 591 days.

(21) Appl. No.: 14/296,097

(22) Filed: Jun. 4, 2014

(65) Prior Publication Data
US 2014/0364566 A1    Dec. 11, 2014

(30) Foreign Application Priority Data
Jun. 5, 2013   (MX) .................... MX/a/2013/006307

(51) Int. Cl.
C08G 81/00    (2006.01)
C08L 71/02    (2006.01)
C08G 65/333   (2006.01)
C08G 65/334   (2006.01)
C08G 65/08    (2006.01)

(52) U.S. Cl.
CPC .......... *C08G 81/00* (2013.01); *C08G 65/333* (2013.01); *C08G 65/3344* (2013.01); *C08G 65/08* (2013.01); *C08G 2650/50* (2013.01); *C08G 2650/58* (2013.01); *C08L 71/02* (2013.01)

(58) Field of Classification Search
CPC .... C08G 81/00; C08G 65/08; C08G 65/3344; C08G 65/333; C08G 65/33317; C08G 65/3346; C08G 2650/02; C08G 2650/04; C08G 2650/50; C08G 2650/58; C08L 71/02
See application file for complete search history.

(56) References Cited

U.S. PATENT DOCUMENTS

| | | | |
|---|---|---|---|
| 2,425,845 A | 8/1947 | Toussaint et al. | |
| 3,334,038 A | 8/1967 | Lucas | |
| 3,835,060 A | 9/1974 | Maddox, Jr. et al. | |
| 5,445,765 A | 8/1995 | Elfers et al. | |
| 5,609,794 A | 3/1997 | Taylor | |
| 6,294,093 B1 | 9/2001 | Selvarajan et al. | |
| 2004/0266973 A1 | 12/2004 | Strickland et al. | |
| 2010/0140141 A1* | 6/2010 | Cendejas Santana | C08G 65/33306 208/188 |

FOREIGN PATENT DOCUMENTS

| MX | 301344 | 6/2012 |
|---|---|---|
| MX | MX/a/2013/002359 | 2/2013 |
| WO | 2007/115980 | 10/2007 |

OTHER PUBLICATIONS https://en.wikipedia.org/wiki/Amine; 2017.*
Kokal, S., Crude-oil emulsions, Petroleum Engineering Handbook, vol. 1, Chapter 12.
Al-Sabagh, A.M. et al., Breaking water in crude oil emulsions by novel demulsifiers based on maleic anhydride-oleic acid adduct, Petroleum Science and Technology (2002) vol. 20, Nos. 9 & 10, pp. 887-914.
Diaz-Ponce, J.A. et al., Differential scanning calorimetry characterization of water-in-oil emulsions from Mexican crude oils, J Therm Anal Calorim (2010) 102:899-906.
Wu, J. et al., Effect of EO and PO positions in nonionic surfactants on surfactant properties and demulsification performance, Colloids and Surfaces A: Physicochem. Eng. Aspects (2005) 252:79-85.
Abdel-Azim, A. et al., Polyoxyalkylenated amines for breaking water in oil emulsions: effect on structural variations on the demulsifiation efficiency, Polymers for Advanced Technologies (1998) 9:159-166.
Alvarez, F. et al., Dissipative particle dynamics (DPD) study of crude oil-water emulsions in the presence of a functionalized co-polymer, Energy & Fuels (2011) 25(2), 562-567.

* cited by examiner

*Primary Examiner* — Roberto Rabago
(74) *Attorney, Agent, or Firm* — Dickinson Wright PLLC

(57) ABSTRACT

A chemical synthesis process is provided for the functionalization of monodispersed triblock copolymer ($POE_w$-$POP_y$-$POE_w$) with secondary or tertiary amines at a semi-industrial level in glass reactors having a capacity between 1 L and 100 L. The process includes two stages where the first stage uses an alkylsulfonyl or arylsulfonyl chloride to obtain better leaving groups, and the second stage is the nucleophilic substitution with secondary or tertiary amines, to obtain the bifunctionalized triblock copolymers. The main advantage for this process is to reduce the quantity of unitary process done in each stage, the optimization of reaction times, and the stoichiometric relationships.

24 Claims, 1 Drawing Sheet

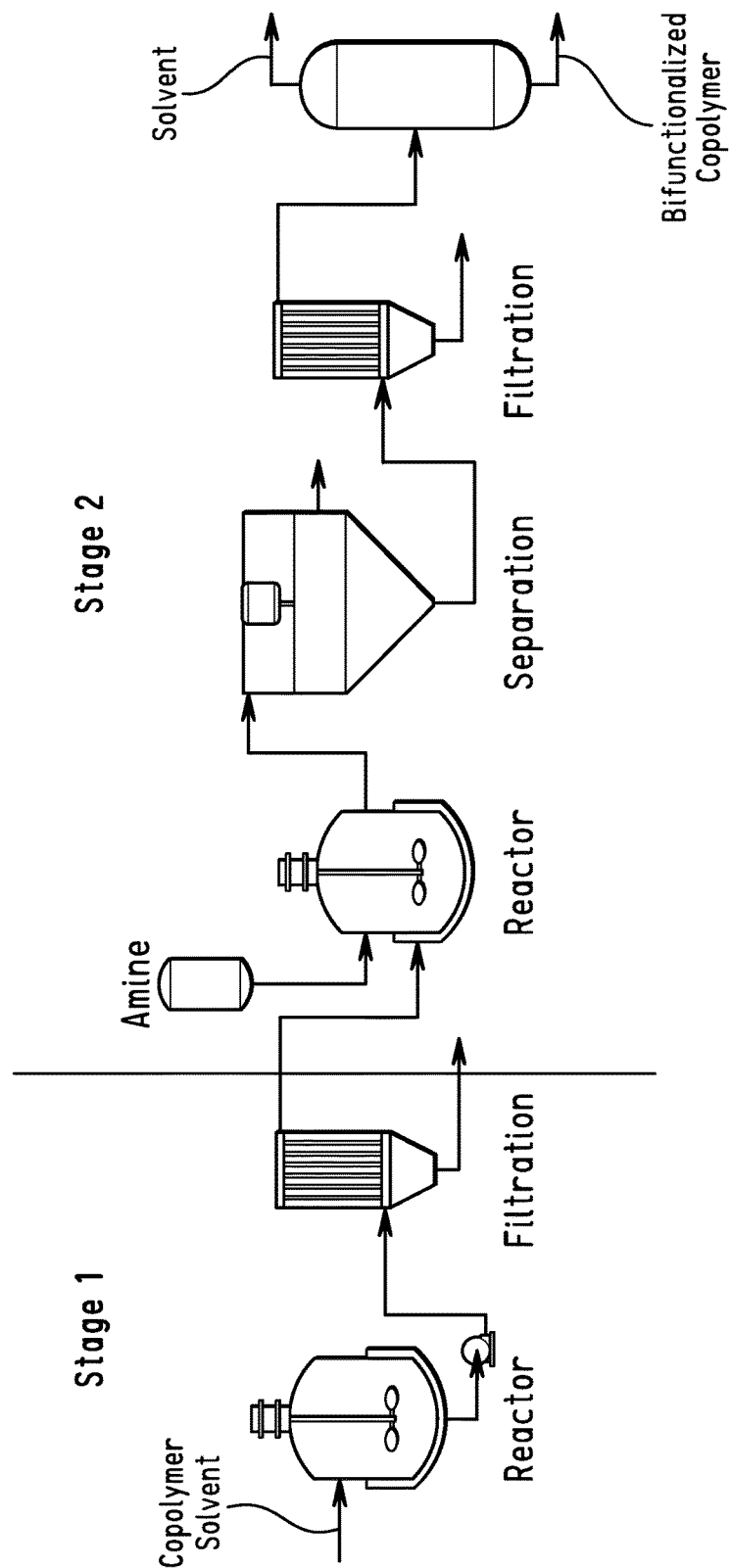

SCALE-UP PROCESS OF BIFUNCTIONALIZED TRIBLOCK COPOLYMERS WITH SECONDARY AND TERTIARY AMINES, WITH APPLICATION IN DEWATERING AND DESALTING OF HEAVY CRUDE OILS

CROSS-REFERENCE TO RELATED APPLICATION

This application claims the benefit and priority under 35 U.S.C. § 119 to Mexican Patent Application No. MX/a/2013/006307 with a filing date of Jun. 5, 2013, the disclosure of which is incorporated herein by reference in its entirely.

FIELD OF THE INVENTION

This invention relates to chemical synthesis on a semi-industrial scale of bifunctionalized copolymers with secondary and tertiary amines that are used in the dewatering and demulsification of heavy crude oils. The novelty of this invention includes the development of an improved process for the synthesis that reduces time and quantity over a unitary process

BACKGROUND OF THE INVENTION

The extraction of crude oil produces a high quantity of water, which can be as free fluid or as an emulsion in crude oil. If during the extraction and transport stages, theses fluids suffer high shear stress, stable water in oil emulsions are obtained. This can happen even in ducts, such as pumping zones, storage tanks, treatment installations and refineries. Water in crude oil emulsions consists of water droplets dispersed in a homogeneous phase of crude oil.[1,2] Stability of water in crude oil depends strongly on the adsorption-desorption kinetic of natural surfactants (mainly asphaltenes) and the rheological properties of interfacial film. This film is formed as a consequence of the supramolecular interactions of emulsifiers with molecules of high boiling point, such as asphaltenes and resins, which decrease the interfacial tension and provoke the water droplet dispersion. Asphaltenes are molecules that have several condensed aromatic rings with different aliphatic and naphthenic substituents, which are able to stack, coordinating simultaneously with water droplets and avoid coalescence.

Nowadays, there are physical and chemical methods that are employed individually or sequentially to break the emulsion of water dispersed in crude oil. The physical methods include an electric field and mechanic effect device. These methods can be combined with heat, in order to increase the frequency and collision forces between the dispersed water droplets.[1,2,3,4]

Regarding the chemical treatment, breaking the water in crude oil emulsion requires the addition of a demulsifier compound, which is a surfactant that reduces and breaks the interfacial film between components, increasing the coalescence of water droplets. The election of the most convenient demulsifier depends on several factors: concentration, characteristic of crude oil, time of emulsion mixed and optimal residence time.

Demulsifiers employed in the crude oil industry are commercial formulations that have several chemical product families (ethylene and propylene oxide copolymers, alkoxylates resins of alkoxyphenol formaldehyde, alkoxylated amines, alkoxylated resins of alkoxyphenol formaldehyde, alkoxylated amines, alkoxylated epoxy resins, etc) dissolved in one or several solvents (toluene, xylene, alcohols of short chain, naphtha, etc.).[5]

Pluronic® and Tetronic® are commercial formulations that are applied as demulsifier and emulsion water in crude oil breakers. The first one is a triblock copolymer of polyoxyethylene-polyoxypropylene-polyoxyethylene (POE-POP-POE) that use ethyleneglycol as an initiator. The second one also is a triblock copolymer of polyoxypropylene-polyoxyethylene-polyoxypropylene (POP-POE-POP) which uses ethylenediamine as an initiator.[6,7]

U.S. Pat. Nos. 2,425,845 and 3,334,038 disclose the production process of copolymers with POE-POP-POE structure and the usage of following glycols as initiators of polymerization: ethyleneglycol, 1,2-propyleneglycol, 1,3-propyleneglycol, buthyleneglycol, diethyleneglycol, dipropyleneglycol, triethyleneglycol, tripropyleneglycol and others aliphatic glycols.[8,9]

U.S. Pat. No. 3,835,060 discloses a process to break an emulsion using a formulation of ether-alkyl-polyglycol sulphates and block copolymers of polyoxyethylene-polyoxypropylene. The chemical structure of alkylpolyglycol ethers used in this process are shown in formula 1, where R is the alkyl group (n=1-10 and M is an alkaline metal, alkaline earth metal or quaternary nitrogen atom. Emulsion breaking occurs after 120 minutes, when the mixture is added at concentration of 20 to 140 ppm; although the crude oil type is not specified, a maximum separation of water 35% was described.[10]

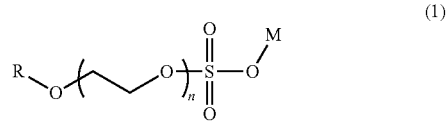

(1)

U.S. Pat. No. 5,445,765 discloses demulsifiers of alkoxylated polyethylenimines with propylene oxide and ethylene oxide, which can be employed successfully in a temperature range between 10 and 130° C. These dehydrating agents were used in crude oil of Oriental Affric, giving a separation 47% in three hours. However, crude oil composition is not mentioned in the patent.[11]

U.S. Pat. No. 5,609,794 discloses polyalkylglycol and ethylene oxide, which is esterified with an anhydride in order to obtain a diester. This compound was made to react with a vinyl monomer to synthesize several esters. Formulations are applied in a concentration range of 10 to 1500 ppm and in a range of 7 and 80° C. Products employed as dehydrating agents of crude oil (characterization is not mentioned) and other refinery products (turbosine, gasoline, lubricants, etc.). The patent discloses a water separation of 40% obtained in a few minutes.[12]

U.S. Pat. No. 6,294,093 discloses a formulation of demulsifiers composed of dicarbamates and polyalkoxylate alkylphenol resin. The formulations are composed for water and soluble organic compound, and are applied to water in crude oil emulsion in concentrations between 50 to 1000 ppm; the characteristics of crude oil are not mentioned.[13]

U.S. Patent Publication No. 2004/0266973 discloses an alkylphenol arylaldehyde alkoxylated polymer able to separate water-oil emulsion, including crude oil and other refinery fluids. This is applied as a prepared formulation in several organic solvents and naphtha, concentrations of 1 to 3000 ppm, but the main characteristics of crude oil are not mentioned.[14]

International Publication No. WO 2007/115980 discloses an ortho-ester alkoxylated provoking the separation of water in an emulsion. The general structure of the ortho-ester is shown in formula 2, where $R_1$ is H or a hydrocarbon chain, $R_2$, $R_3$ and $R_4$ are alkyloxy and/or ethyloxy groups of C3-C4 carbon atoms. The described products in this publication were evaluated in North Sea and Orient Medium crude oils. It was determinate a separation between 30 and 100% for these products.[15]

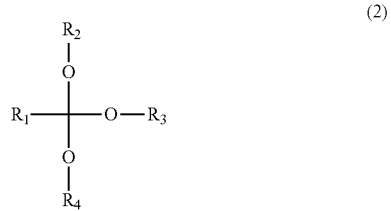

(2)

From the economical and operational point of view, it is very important to separate the water from crude oil emulsions and, simultaneously, to remove the inorganic salts dissolved in the aqueous phase, diminishing, by this way, the corrosion in petroleum industry and the catalyst poisoning during the refining stage. Furthermore, the removal of water improves quality storage, exploitation and use of crude oil.

Considering the great importance of these technical necessities, formulations of bifunctionalized block copolymers with secondary amines of low polydispersity have been produced, that are more efficient than the commercial formulations in the dehydrating of heavy crude oil. These copolymers are disclosed in Mexican Patent Mx/a/2008/015756 registration number and Mexican Patent No. 301344, issued Jun. 27, 2012.

With the same target to resolve these technical necessities, new formulations of bifunctionalized block copolymers with tertiary amines of low polydispersity were obtained, which also resulted in very efficient break up of water in heavy crude oil emulsion. These copolymers are disclosed in Mexican patent Mx/a/2013/002359.

Under both types of formulations, bifunctionalized block copolymers with secondary amines and bifunctionalized block copolymers with tertiary amines, show high efficiency of the commercial formulations in the breakup of water in heavy crude oil emulsion. It was evident of the need for synthesizing at industrial scale both types of copolymers for their future application in some oil fields in Mexico.

However, the synthesis described in both patents was done at laboratory scale (50-100 g), which was too expensive for its application at industrial level.

The synthesis begins when ethylene glycol reacts with potash (KOH) in methanol as a solvent to obtain the salt named potassium ethyleneglycolate (EGP), which was first made to react with propylene oxide (OP) and after with ethylene oxide (OE) to obtain the triblock copolymer ethylene polyethylene oxide-polypropylene oxide-polyethylene oxide ($POE_w$-$POP_y$-$POE_w$).

Afterwards, the $POE_w$-$POP_y$-$POE_w$ copolymer, that has an end hydroxyl group, is submitted to reaction in dichloromethane with tosyl chloride (TsCl) to obtain the tosilated triblock copolymer (Ts-$POE_w$-$POP_y$-$POE_w$-Ts). This reaction was carried out to convert the hydroxyl group as good leaving group and that is susceptible to nucleophilic substitution. Until this synthesis stage there is similarity to the Mx/a/2008/015756 and Mx/a/2013/002359 patent applications.

The difference occurs when the Ts-$POE_w$-$POP_y$-$POE_w$-Ts copolymer reacts with different secondary amines to obtain the bifunctionalized copolymers disclosed in the Mx/a/2008/015756 patent application.[16,17] On the other hand, when the copolymer reacts with tertiary amines, the copolymers described in the Mx/a/2013/002359 patent application are synthesized.

Bifunctionalized copolymers with amines owe the efficiency to the following factors: inclusion of the appropriate functional group, correct proportion of the triblocks, low monodispersity and ideal molecular weight; this last was demonstrated recently by dissipative particle dynamics study.[18]

SUMMARY OF THE INVENTION

The present invention was motivated by the need to synthesize on a large scale the bifunctionalized triblock copolymers with secondary and tertiary amines, and by the detailed analysis that the synthesis at a laboratory scale was inappropriate for the synthesis on a large scale.

Therefore, the present invention is directed to the development of a process to synthesize bifunctionalized copolymers with amines on an industrial scale, considering as basis the chemical synthesis described in the two Mexican patent applications mentioned earlier, using as raw material the copolymer POE-POP-POE, which is a commercial product. The process developed takes into account two synthesis stages, in which the first stage is the preparation of Ts-$POE_w$-$POP_y$-$POE_w$-Ts from $POE_w$-$POP_y$-$POE_w$; and the second stage is the substitution with secondary or tertiary amines over Ts-$POE_w$-$POP_y$-$POE_w$-Ts to obtain the bifunctionalized copolymers with secondary amines Y-$POE_w$-$POP_y$-$POE_w$-Y and tertiary amines Z-$POE_w$-$POP_y$-$POE_w$-Z. This invention also presents an improvement of the laboratory synthesis through the optimization of the reaction stoichiometry, decreasing the number of unitary operations in each stage, as well as reaction times.

The present invention is directed to the development of a synthesis process at semi-industrial scale of 1 to 100 L to synthesize block copolymers bifunctionalized with secondary and tertiary amines, with application as demulsifiers of crude oil. Reaction conditions and unitary process in each stage are the best to obtain the monodisperse block copolymer and functionalized with secondary and tertiary amines at this scale.

The invention is further directed to a method of demulsifying crude oil/water emulsions comprising the step of adding an amount of the secondary and/or tertiary amine functionalized block copolymer to demulsify the emulsion.

In one embodiment of the invention, the process produces $POE_w$-$POP_y$-$POE_w$ block copolymer that is bifunctionalized with a secondary amine. The process reacts a $POE_w$-$POP_y$-$POE_w$ block copolymer with an alkylsulfonyl or arylsulfonyl chloride in a molar ratio of about 1.0/2.0 to 1.0/6.0 in the presence of a base and a solvent. The base is present at a molar ratio of the copolymer/base of about 1.0/2.0 to 1.0/8.0. The solvent is present in a weight/volume ratio of the copolymer/solvent of about 1.0/1.0 to 1.0/10.0. The first stage of the reaction produces the α,ω-dialkylsulfonyl ester or α,ω-diarylsulfonyl ester of $POE_w$-$POP_y$-$POE_w$.

In the second stage, the dialkylsulfonyl or diarylester of the copolymer is reacted with a secondary amine at a molar ratio of the copolymer/secondary amine of 1.0/2.0 to 1.0/

10.0 in the presence of a base in an amount of about 2-10 moles of base per mole of the copolymer and in the presence of a solvent in a weight/volume ratio of copolymer/solvent of about 1.0/1.0 to 1.0/10.0 to obtain the bifunctionalized copolymer. In one embodiment, the base can be the same as the base used in the first stage.

In another embodiment, the copolymer is bifunctionalized with a tertiary amine. The dialkylsulfonyl or diarylsulfonyl ester of the copolymer obtained in the previous embodiment is reacted with a tertiary amine at a molar ratio of the copolymer/tertiary amine of about 1.0/2.1 to 1.0/5.0 and in the presence of a solvent to obtain the tertiary amine bifunctionalized copolymer. The solvent is included in a weight/volume ratio of the copolymer/solvent of about 1.0/1.0 to 1.0/5.0.

REFERENCES

1. S. L. Kokal. *Crude-oil emulsions*. Petroleum Engineering Handbook, Vol. 1, Chapter 12.
2. A. M. Al-Sabagh, A. M. Badawi and El. Den M. R. Noor. (2002) *Breaking water in crude oil emulsions by novel demulsifiers based on maleic anhydride-oleic acid adduct*. Pet. Sci. Tech. 20, 887-914.
3. R. Selvajaran, A. Sivakumar and R. A. Marble. (2001) Aqueous dispersion of an oil soluble demulsifier for breaking crude oil emulsions U.S. Pat. No. 6,294,093.
4. J. A. Díaz-Ponce, E. A. Flores, A. López-Ortega, J. G. Hernández, L. V. Castro, A. Estrada and F. Vázquez. (2010) *Differential Scanning calorimetry Characterization of Water in Oil Emulsions of Mexican Crude Oils*, J. Therm. Anal. calorim. 102 (3), 899.
5. P. Hellberg and I. Uneback. Environmentally-friendly oil/water demulsifier. WO 2007/115980.
6. J. Wu, Y. Xu, T. Dabros and H. Hamza. (2005) *Effect of EO and PO positions in nonionic surfactants on surfactant properties and demulsification performance*. Colloids Surf. A: Physicochem. Eng. Aspect., 252, 79.
7. A. Abdel-Azim, N. N. Zaki and N. E. S. Maysour. (1998) *Polyoxyalkylenated amines for breaking water in oil emulsions: effect on structural variations on the demulsifiation efficiency*. Pol. Adv. Tech., 9, 159.
8. W. J. Toussaint et al, U.S. Pat. No. 2,425,845. (1945) Mixture of polyoxyalkylene diols and methods of making such mixtures.
9. R. N. Lucas, U.S. Pat. No. 3,334,038. (1964) Phase separation process.
10. J. Maddox Jr., et al, U.S. Pat. No. 3,835,060. (1972) Demulsification compositions containing alkyl ether sulfates.
11. B. Guenther Elfers, M. Wilfried Sager, F. Hans-Henning Vogel, L. Knut Oppenlaender, U.S. Pat. No. 5,445,765. (1995) Petroleum emulsion breakers.
12. G. N. Taylor, U.S. Pat. No. 5,609,794. (1997) Demulsifier for water-in-oil emulsions, and method of use.
13. D. G. Radhkrishnan Selvarajan, A. Ananthasubramanian Sivakumar, R. A. Marble, U.S. Pat. No. 6,294,093. (2001) Aqueous dispersion of an oil soluble demulsifier for breaking crude oil emulsions.
14. J. B. Strickland, P. M. Lindemuth, G. N. Taylor, US 2004/0266973 A1. (2004) Alkoxylated alkylphenol-arylaldehyde polymer.
15. P. E Hellber, I. Uneback, WO 2007/115980A1. (2007) Environmentally-friendly oil/water demulsifiers.
16. Aristeo Estrada Buendia, Marcelo Lozada y Cassou, Gabriel Cendejas Santana, Eugenio Alejandro Flores Oropeza, Laura Verónica Castro Sotelo, Flavio Salvador Vázquez Moreno, MX/a/2008/015756. (2008) Formulaciones desemulsificantes y deshidratantes para crudos pesados a base de copolímeros en bloques bifuncionalizados con aminas.
17. Gabriel Cendejas Santana, Eugenio Alejandro Flores Oropeza, Laura Verónica Castro Sotelo, Aristeo Estrada Buendía, Marcelo Lozada y Cassou, Flavio Salvador Vázquez Moreno, US 2010/0140141 A1. (2010) Demulsifying and dehydrating formulations for heavy crude oils based on block copolymers bifunctionalized with amines.
18. F. Alvarez, E. A. Flores, L. V. Castro, J. G. Hernández, A. López and F. Vázquez. (2011) *DPD study of water/crude oil emulsions in the presence of a functionalized copolymer Energy & Fuels*, 25 (2), 562.

BRIEF DESCRIPTION OF THE DRAWINGS

FIG. 1 shows the process diagram for the present invention. In stage 1, once the reaction time is complete, the reaction product is filtered. The organic phase is again charged to the reactor, and a secondary or tertiary amine is added and the reaction of stage 2 is carried out at the solvent boiling point. At the end of reaction time, the reaction product is filtered and solvent is eliminated by vacuum pressure distillation.

DETAILED DESCRIPTION OF THE INVENTION

The synthesis process of the invention for the functionalization of triblock copolymers is described as follows. Stage 1 comprises the replacement of the ending hydroxyl group (—OH) for the leaving group (TsCl). In stage 2, the substitution of tosylate ester for secondary or tertiary amines is carried out to obtain the triblock copolymer bifunctionalized with amines. This laboratory process is described in the Mx/a/2008/015756 and Mx/a/2013/002359. One example of the process according to the present invention is shown in the following reaction scheme:

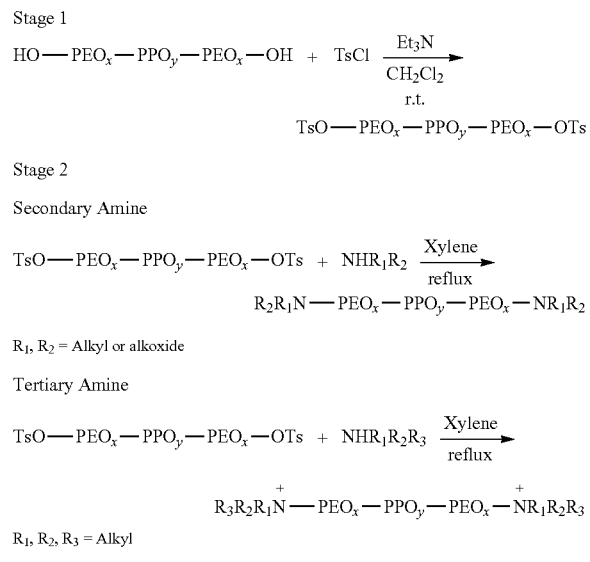

Therefore, the present invention is the development of a synthesis process at semi-industrial and industrial scales to functionalize the monodispersed block copolymers with secondary or tertiary amines from the laboratory methods described in the patents mentioned earlier. The total synthesis of functionalized block copolymers takes into account two stages:

1) Stage 1 comprises or consists of the alkylsulfonation or arylsulfonation of triblock copolymer poly(oxyethylene)$_w$-poly(oxypropylene)$_y$-poly(oxyethylene)$_w$ (POE$_w$-POP$_y$-POE$_w$), with average molecular weight M$_n$ in a range between 600 and 10,000 g/mol, to obtain the α,ω-dialkylsulfonyl ester or α,ω-diarylsulfonyl ester of poly(oxyethylene)$_w$-poly(oxypropylene)$_y$-poly(oxyethylene)$_w$ (POE$_w$-POP$_y$-POE$_w$), where the number w and y are in the range of 10 to 60, more preferably between 15 and 50.

2) Stage 2 takes into account the nucleophilic substitution reaction of secondary or tertiary amines over the α,ω-dialkylsulfonyl ester or α,ω-diarylsulfonyl ester of poly(oxyethylene)$_w$-poly(oxypropylene)$_y$-poly(oxyethylene)$_w$ in order to obtain diamines of poly(oxyethylene)$_w$-poly(oxypropylene)$_y$-poly(oxyethylene)$_w$ copolymers.

Outstanding characteristics of this development are: a) solvent is the same for stage 1 and 2; b) reduction of one unitary process in stage 1; c) reduction of two unitary process in the stage 2, when secondary amines are used; and d) modifications in the reaction conditions (temperature, reagents and molar relations) for both stages, having impact in a lower reaction time in each stage. FIG. 1 shows the process diagram for both stages of the present invention. The reactor should be of glass with a capacity of 1 to 100 L, with propeller stirrer of Teflon to avoid corrosion problems caused by alkylsulfonyl or arylsulfonyl chloride.

Stage 1. Reaction temperature, which is carried out in stage 1, is set in a range between 5 to 50° C., preferably between 10 to 45° C., and more preferably between 15 to 35° C. Reaction times are set in a range between 1 to 8 hours, preferably of 3 to 6 hours. Molar relationship of triblock copolymer POE$_w$-POP$_y$-POE$_w$/alkylsulfonyl or arylsulfonyl chloride is between 1.0/2.0 to 1.0/6.0, preferably between 1.0/2.2 to 1.0/4.5, and more preferably between 1.0/2.5 to 1.0/3.5. Alkylsulfonyl or arylsulfonyl chloride is added in reactant-starved condition at mass flow between 1 to 50 g/min, preferably between 5 to 40 g/min, and more preferably between 15 to 30 g/min. It is important that the usage of a base such as: bicarbonates (sodium, potassium, calcium or magnesium), carbonates (sodium, potassium, calcium or magnesium), triethylamine, tripropylamine, N,N-dimethylaniline or pyridine, in triblock copolymer POE$_w$-POP$_y$-POE$_w$/base in a molar ratio between 1.0/2.0 to 1.0/8.0, preferably between 1.0/2.5 to 1.0/6.0 The base reacts in reagent-starved conditions at mass flow between 1 to 70 g/min, preferably between 5 to 60/g/min, and more preferably between 15 to 45 g/min. The reaction is carried out in solvents such as: acetonitrile, benzonitrile, chloroform, carbon tetrachloride, 1,2-dichloroethane, chlorobenzene, dioxane, dimethylformamide, dimethylsulfoxide, dimethylether ethyleneglycol, 2-methoxyethylether or tetrahydrofurane, at weight/volume ratio (w/v) of triblock POE$_w$-POP$_y$-POE$_w$/solvent between 1.0/1.0 to 1.0/10.0, preferably between 1.0/2.0 to 1.0/7.0, and more preferably between 1.0/2.5 to 1.0/5.0. Finally, the product is filtered at reduced pressure or by a filter press. In one embodiment, the solvent is not removed from the resulting product.

Stage 2 Synthesis of Y-POE$_w$-POP$_y$-POE$_w$-Y (with Secondary Amines). Reaction temperature is set in a range between 30 to 100° C., preferably between 35 to 85° C. Reaction times are set in a range of 2 to 10 hours, preferably between 3 to 8 hours. Molar reaction of the secondary amine with respect to the α,ω-dialkylsulfonylester or α,ω-diarylsulfonyl ester of triblock copolymer POE$_w$-POP$_y$-POE$_w$ obtained in stage 1 is between 2.0 to 10.0 moles, preferably between 2.5 to 8.5 moles, and more preferably between 3.0 to 6.5 moles per mole of the POE$_w$-POP$_y$-POE$_w$. In one embodiment, the ratio of POE$_w$-POP$_y$-POE$_w$/tertiary amine is 1.0/2.1 to 1.0/5.0. The amine is added in reactant-starved conditions at mass flow between 1 to 60 g/min, preferably between 10 to 55 g/min, and more preferably between 15 to 45 g/min. The base in this stage are mainly: bicarbonates (sodium, potassium, calcium or magnesium), carbonates (sodium, potassium, calcium or magnesium), triethylamine, tripropylamine, N,N-dimethylaniline or pyridine, in a molar ratio of α,ω-dialkylsulfonyl ester or α,ω-diarylsulfonyl ester of triblock copolymer POE$_w$-POP$_y$-POE$_w$ between 2.0 to 8.0 moles, preferably between 3.0 to 6.5 moles. In one embodiment, the ratio of the POE$_w$-POP$_y$-POE$_w$ to the base can be 1:2 to 1:10. Also, a secondary amine can be used in an excess in molar relationship regarding the α,ω-dialkylsulfonyl ester or α,ω-diarylsulfonyl ester of triblock copolymer POE$_w$-POP$_y$-POE$_w$ between 3.0 to 10.0 moles, preferably between 4.0 to 8.0 moles. The base or amine excess is added in reagent-starved conditions at mass flow between 1 to 70 g/min, preferably between 10 to 60 g/min, and more preferably between 15 to 45 g/min. The reaction is carried out in solvents such as: acetonitrile, benzonitrile, chloroform, carbon tetrachloride, 1,2-dichloroethane, chlorobenzene, dioxane, dimethylformamide, dimethylsulfoxide, dimethylether ethyleneglycol, 2-methoxyethylether or tetrahydrofurane, at weight/volume relationship (w/v) of triblock POE$_w$-POP$_y$-POE$_w$/solvent between 1.0/1.0 to 1.0/10.0, preferably between 1.0/2.0 to 1.0/7.0, and more preferably between 1.0/2.5 to 1.0/5.0. In one embodiment, the POE$_w$-POP$_y$-POE$_w$/solvent ratio is 1.0/1.0 to 1.0/15.0. Finally, the product is filtered at reduced pressure or by a filter press.

Stage 2 Synthesis of Z-POE$_w$-POP$_y$-POE$_w$-Z (with Tertiary Amines).

Reaction temperature is set in range between 50 to 130° C., preferably between 60 to 110° C. Reaction times are set in a range from 7 to 17 hours, preferably between 9 to 15 hours. Molar relationship of the tertiary amine regarding α,ω-dialkylsulfonyl ester or α,ω-diarylsulfonyl ester of triblock copolymer POE$_w$-POP$_y$-POE$_w$ is between 2.1 to 5.0 moles, preferably between 2.2 to 4.5 moles, and more preferably between 2.5 to 4.0 moles per mole of POE$_w$-POP$_y$-POE$_w$. The amine is added in reagent-starved conditions at mass flow between 1 to 60 g/min, preferably between 10 to 55 g/min, and more preferably between 15 to 45 g/min. The reaction is carried out in a solvent such as: acetonitrile, benzonitrile, chloroform, carbon tetrachloride, 1,2-dichloroethane, chlorobenzene, dioxane, dimethylformamide, dimethylsulfoxide, dimethylether ethyleneglycol, 2-methoxyethylether or tetrahydrofurane, a weight:volume ratio (w/v) of triblock POE$_w$-POP$_y$-POE$_w$/solvent between 1.0/1.0 to 1.0/15.0, or 1.0/1.0 to 1.0/10.0, preferably between 1.0/2.0 to 1.0/7.0, and more preferably between 1.0/2.5 to 1.0/5.0. Finally, the product is filtered at reduced pressure or by a filter press, and solvent is eliminated by distillation at reduced pressure.

In stage 1 of the process, the alkylsulfonyl or arylsulfonyl chloride can be selected from the group consisting of methanesulfonyl chloride, trichloromethanesulfonyl chloride, ethanesulfonyl chloride, 2-methoxyethane-1-sulfonyl chloride, 1-propanosulfonyl chloride, isopropylsulfonyl chloride, 3,3,3-trifluoropropane-1-sulfonyl chloride, 1-butanesulfonyl chloride, benzenesulfonyl chloride, 2-chlorobenzenesulfonyl chloride, 3-methylbutane-1-sulfonyl chloride, 3-benzenesulfonyl chloride, cyclopentanesulfonyl chloride, 4-benzenesulfonyl chloride, para-toluenesulfonyl chloride, trifluoromethylbenzenesulfonyl chloride, nitrobenzenesulfonyl chloride, 1,4-benzodioxane-6-sulfonyl chloride, biphenyle-4-sulfonyl chloride, 4'-chlorobiphenyle-4-sulfonyl chloride, 4'-metoxybiphenyl-4-sulfonyl chloride, 4'-fluorobiphenyl-4-sulfonyl chloride, 4'-methylbiphenyle-4-sulfonyl chloride, and 4-bromobenzenesulfonyl chloride.

In stage 2 of the process, the secondary amine can be selected from the group consisting of ammonia, amylamine, iso-amylamine, tert-amylamine, 1-ethylpropylamine, hexylamine, 2-amine-5-methylhexane, heptylamine, octylamine, nonylamine, decylamine, dodecylamine, undecylamine, 3-(cyclohexyl)propane-1-amine, (2-methylbutyl)amine, tris-(2-ethylhexyl)amine, 1-ethoxypropane-2-amine, (3-methylpentyl)amine, 2-phenylbutane-1-amine, tetrahydro-2H-pirane-3-amine, methoxy-polyethyleneglycolamine, (3-butoxyphenyl)amine, (2-cyclooctylethyl)amine, (2-cycloheptyl)amine, (3-cyclopentylpropyl)amine, 3-(4-isopropylphenyl)propane-1-amine, 2-ethyl-1-phenylbutane-1-amine, cyclopentylamine, cycloheptylamine, cycloheptylmethylamine, cyclohexylamine, cyclooctylamine, benzylamine, (2,2-dimethylpropyl)(methyl)amine, N-methyl-N-(1-pentylethyl)amine, (4-chloro-benzyl)-methylamine, bis-(2-ethylhexyl)amine, N-benzyl-N-(2-methoxyethyl)amine, diisopropylamine, 2-(methylamine)-ethanol, 2-(butylamine)-ethanol, 2-(benzylamine)-ethanol, 2-(cyclohexylamine)-ethanol, 2-(ter-butylamine)-ethanol, 2-(phenylamine)-ethanol, 2-(n-propylamine)-ethanol, 2-(iso-propylamine)-ethanol, 2-(hydroxymethylamine)-ethanol, 2,2'-imidoethanol, 1,1'-iminodi-2-propanol, 4-(butylamine)-1-butanol, 1-benzylpiperazine, 1-phenylpiperazine, 2-(hexylamino)-ethanol, 1-acetylpiperazine, 1-(ortho-chlorophenyl)-piperazine, 1-ethylpiperazine, 1-(methyl-tolyl)-piperazine, 1-(4-nitrophenyl)-piperazine, 4-benzylpiperidine, 4-methylpiperidine, 2-methylpiperidine, 2-ethylpiperidine, 3,5-dimethylpiperidine, piperidine-3-ol, piperidine-4-ol, trans-3,5-dimethylpiperidine, cis-3,5-dimethylpiperidine, 3-methylpiperidine, piperidine-3-ylmethanol, 3,3-dimethylpiperidine, 4-phenylpiperidine-3-ol, 4-phenyl-piperidine, 4-(piperidine-4-il)morpholine, 4,4'-bipiperidine, pyrrolidine-3-amine, 2,6-dimethylmorpholine, morpholine, pyrrolidine-2-ylmethanol, trans-2,5-dimethylpyrrolidine, cis-2,5-dimethylpyrrolidine, diphenylamine, 2-nitro-diphenylamine, 4-nitro-diphenylamine, pyrrolidine, 4,4'-bis(dimethylamine)-diphenylamine, 2,4-dinitro-diphenylamine, 4,4'-dimethoxy-diphenylamine, diethylamine, dipropylamine, dibutylamine, dipentylamine, dihexylamine, dioctylamine, didecylamine, didodecylamine, dinonylamine, N-methyl-hexylamine, di-iso-propylamine, N-iso-propyl-tert-butylamine, N-ethyl-ter-butylamine, N-ethyl-butylamine, di-isobutylamine, iso-butyl-sec-butylamine, di-iso-pentylamine, ethyl-n-dodecylamine, di-ter-amylamine, N-methyl-pentylamine, N-methyl-butylamine, N-methyl-ter-butylamine, N-ethyl-iso-propylamine, N-ethyl-propylamine, N-methyl-octylamine, and piperidine.

In stage 2of the process, the secondary amine can be selected from the group consisting of ammonia, amylamine, iso-amylamine, tert-amylamine, 1-ethylpropylamine, hexylamine, 2-amine-5-methylhexane, heptylamine, octylamine, nonylamine, decylamine, dodecylamine, undecylamine, 3-(cyclohexyl)propane-1-amine, (2-methylbutyl)amine, tris-(2-ethylhexyl)amine, 1-ethoxypropane-2-amine, (3-methylpentyl)amine, 2-phenylbutane-1-amine, tetrahydro-2H-pirane-3-amine, methoxy-polyethyleneglycolamine, (3-butoxyphenyl)amine, (2-cyclooctylethyl)amine, (2-cycloheptyl)amine, (3-cyclopentylpropyl)amine, 3-(4-isopropylphenyl)propane-1-amine, 2-ethyl-l-phenylbutane-1-amine, cyclopentylamine, cycloheptylamine, cycloheptylmethylamine, cyclohexylamine, cyclooctylamine, benzylamine, (2,2-dimethylpropyl)(methyl)amine, N-methyl-N-(1-pentylethyl)amine, (4-chloro-benzyl)-methylamine, bis-(2-ethylhexyl)amine, N-benzyl-N-(2-methoxyethyl)amine, diisopropylamine, 2-(methylamine)-ethanol, 2-(butylamine)-ethanol, 2-(benzylamine)-ethanol, 2-(cyclohexylamine)-ethanol, 2-(ter-butylamine)-ethanol, 2-(phenylamine)-ethanol, 2-(n-propylamine)-ethanol, 2-(iso-propylamine)-ethanol, 2-(hydroxymethylamine)-ethanol, 2,2'-imidodiethanol, 1,1'-iminodi-2-propanol, 4-(butylamine)-1-butanol, 1-benzylpiperazine, 1-phenylpiperazine, 2-(hexylamino)-ethanol, 1-acetylpiperazine, 1-(ortho-chlorophenyl)-piperazine, 1-ethylpiperazine, 1-(methyl-tolyl)-piperazine, 1-(4-nitrophenyl)-piperazine, 4-benzylpiperidine, 4-methylpiperidine, 2-methylpiperidine, 2-ethylpiperidine, 3,5-dimethylpiperidine, piperidine-3-ol, piperidine-4-ol, trans-3,5-dimethylpiperidine, cis-3,5-dimethylpiperidine, 3-methylpiperidine, piperidine-3-ylmethanol, 3,3-dimethylpiperidine, 4-phenylpiperidine-3-ol, 4-phenyl-piperidine, 4-(piperidine-4-il)morpholine, 4,4'-bipiperidine, pyrrolidine-3-amine, 2,6-dimethylmorpholine, morpholine, pyrrolidine-2-ylmethanol, trans-2,5-dimethylpyrrolidine, cis-2,5-dimethylpyrrolidine, diphenylamine, 2-nitro-diphenylamine, 4-nitro-diphenylamine, pyrrolidine, 4,4'-bis(dimethylamine)-diphenylamine, 2,4-dinitro-diphenylamine, 4,4'-dimethoxy-diphenylamine, diethylamine, dipropylamine, dibutylamine, dipentylamine, dihexylamine, dioctylamine, didecylamine, didodecylamine, dinonylamine, N-methyl-hexylamine, di-iso-propylamine, N-iso-propyl-tert-butylamine, N-ethyl-ter-butylamine, N-ethyl-butylamine, di-isobutylamine, iso-butyl-sec-butylamine, di-iso-pentyl amine, ethyl-n-dodecylamine, di-ter-amylamine, N-methyl-pentylamine, N-methyl-butylamine, N-methyl-ter-butylamine, N-ethyl-iso-propylamine, N-ethyl-propylamine, N-methyl-octylamine, and piperidine.

Stage 1. Alkylsulfonation or Arylsulfonation of Triblock Copolymer Poly(Oxyethylene)$_w$-Poly(Oxypropylene)$_y$-Poly(Oxyethylene)$_w$ (POE$_w$-POP$_y$-POE$_w$)

EXAMPLE 1

In a 1 L reactor having a Teflon mechanical stirrer and temperature regulator bath, is added 250 g (0.1051 mol) of poly(oxyethylene)$_w$-poly(oxypropylene)$_y$-poly(oxyethylene)$_w$ (POE$_w$-POP$_y$-POE$_w$) copolymer dissolved in 250 mL of a solvent. At a temperature of 15° C. is added with a dispenser pump 0.2261 moles of alkylsulfonyl or arylsulfonyl chloride dissolved in 75 mL of solvent at reagent-starved conditions. Afterwards, 0.3153 mol of base in 75 mL of solvent is added at reagent-starved conditions. The reactor mixture is agitated for 3 hours, followed by filtration at reduced pressure. 270 g of α,ω-dialkylsulfonyl ester or α,ω-diarylsulfonyl ester of poly(oxyethylene)$_w$-poly(oxypropylene)$_y$-poly(oxyethylene)$_w$ (POE$_w$-POP$_y$-POE$_w$) in 400 mL of solvent was obtained as a yellow viscous liquid. Spectroscopic characterization of α,ω-dialkylsulfonyl ester or α,ω-diarylsulfonyl ester of poly(oxyethylene)$_w$-poly(oxypropylene)$_y$-poly(oxyethylene)$_w$ (POE$_w$-POP$_y$-POE$_w$) is the following: $^{13}$C NMR (CDCl$_3$) 9.47, 17.32, 17.44, 18.27, 46.09, 68.57, 68.65, 68.70, 69.54, 70.61, 70.79, 70.89, 72.93, 73.41, 75.11, 75.31, 75.34, 75.50, 127.92, 129.71, 133.77, 135.26.

EXAMPLE 2

In a 1 L reactor having a Teflon mechanical stirrer and temperature regulator bath, 250 g (0.1051 mol) of poly(oxyethylene)$_w$-poly(oxypropylene)$_y$-poly(oxyethylene)$_w$ (POE$_w$-POP$_y$-POE$_w$) copolymer dissolved in 250 mL of solvent was added. At a temperature of 25° C., 0.2261 mol of alkylsulfonyl or arylsulfonyl chloride at reagent-starved conditions was added with a dispenser pump. Afterwards, from 0.2628 mol to 0.3153 mol of base at reagent-starved conditions was added by a dispenser pump. The reaction mixture is agitated for 6 hours, followed by filtration at reduced pressure. 270 g of α,ω-dialkylsulfonyl ester or α,ω-diarylsulfonyl ester of poly(oxyethylene)$_w$-poly(oxypropylene)$_y$-poly(oxyethylene)$_w$ (POE$_w$-POP$_y$-POE$_w$) in 250 mL of solvent was obtained.

Stage 2. Nucleophilic Substitution Over α,ω-Dialkylsulfonyl Ester or α,ω-Diarylsulfonyl Ester of Triblock Copolymer Poly(Oxyethylene)w-Poly(Oxypropylene)y-Poly(Oxyethylene)w (POE$_w$-POP$_y$-POE$_w$)

Stage 2 Synthesis of Y-POE$_w$-POP$_y$-POE$_w$-Y (With Secondary Amines).

EXAMPLE 3

In a 1 L reactor provided with a Teflon mechanical stirrer and temperature regulator bath, 270 g (0.1016 mol) of product of example 2, α,ω-dialkylsulfonyl ester or α,ω-diarylsulfonyl ester of poly(oxyethylene)$_w$-poly(oxypropylene)$_y$-poly(oxyethylene)$_w$ (POE$_w$-POP$_y$-POE$_w$) dissolved in 250 mL of solvent, and from 0.2032 mol to 0.3048 mol of base in reagent-starved conditions are added; subsequently 0.2184 mol of secondary amine in reagent-starved conditions is added, and the mixture is heated at a temperatures between 42 to 62° C. for 6 hours. Such mixture is filtered at reduced pressure and solvent was distilled at reduced pressure.

EXAMPLE 4

In a 1 L reactor provided with a Teflon mechanical stirrer and temperature regulator bath, is added 270 g (0.1016 mol) of product of example 2, α,ω-dialkylsulfonyl ester or α,ω-diarylsulfonyl ester of poly(oxyethylene)$_w$-poly(oxypropylene)$_y$-poly(oxyethylene)$_w$ (POE$_w$-POP$_y$-POE$_w$) dissolved in 250 mL of solvent, from 0.2032 mol to 0.3048 mol of basis at reagent-starved conditions is added; subsequently from 0.2184 mol to 0.4064 mol of secondary amine at reagent-starved conditions is added, the mixture is heated at a temperature between 60 to 85° C. for 3 hours. Once phases are separated, the inferior phase is filtered at reduced pressure and the solvent is distilled at reduced pressure.

EXAMPLE 5

In an 8 L reactor provided with a mechanical stirrer, reflux system and temperature regulator bath, 2700 g (1.0160 mol) of product of example 2, α,ω-dialkylsulfonyl ester or α,ω-diarylsulfonyl ester of poly(oxyethylene)$_w$-poly(oxypropylene)$_y$-poly(oxyethylene)$_w$ (POE$_w$-POP$_y$-POE$_w$) dissolved in 2500 mL of solvent is added, and between 4.0640 mol to 8.1280 mol of secondary amine at reagent-starved conditions is added, the mixture is heated at a temperature between 50 to 75° C. for 10 hours. At the end of the reaction time, the phases are separated, the inferior phase is filtered at reduced pressure and solvent is distilled at reduced pressure.

EXAMPLE 6

In an 8 L reactor provided with a mechanical stirrer, reflux system and temperature regulator bath, 2700 g (1.0160 mol) of product of example 2, α,ω-dialkylsulfonyl ester or α,ω-diarylsulfonyl ester of poly(oxyethylene)$_w$-poly(oxypropylene)$_y$-poly(oxyethylene)$_w$ (POE$_w$-POP$_y$-POE$_w$) dissolved in 2500 mL of solvent is added, and from 2.0320 mol to 3.0480 mol of secondary amines is added, the mixture is heated at temperature between 80 to 100° C. for 5 hours. At the end of the reaction time, the phases are separated, the inferior phase is filtered at reduced pressure and solvent is distilled at reduced pressure.

Stage 2 Synthesis of Z-POE$_w$-POP$_y$-POE$_w$-Z (With Tertiary Amines).

EXAMPLE 7

In a 1 L reactor provided with a Teflon mechanical stirrer and temperature regulator bath, 270 g (0.1016 mol) of product of example 1, α,ω-dialkylsulfonyl ester or α,ω-diarylsulfonyl ester of poly(oxyethylene)$_w$-poly(oxypropylene)$_y$-poly(oxyethylene)$_w$ (POE$_w$-POP$_y$-POE$_w$) dissolved in 250 mL of solvent is added, 0.2184 mol of tertiary amine under reagent-starved conditions is added, the mixture is heated at solvent boiling point at temperature between 55 to 75° C. for 17 hours. Such mixture is filtered at reduced pressure and solvent is distilled at reduced pressure.

EXAMPLE 8

In a 1 L reactor provided with a Teflon mechanical stirrer and temperature regulator bath, 270 g (0.1016 mol) of product of example 1, α,ω-dialkylsulfonyl ester or α,ω-diarylsulfonyl ester of poly(oxyethylene)$_w$-poly(oxypropylene)$_y$-poly(oxyethylene)$_w$ (POE$_w$-POP$_y$-POE$_w$) dissolved in 250 mL of solvent is added, 0.3084 mol of tertiary amine at regent-starved conditions is added, the mixture is heated at solvent boiling point at temperature between 75 to 95° C., for 12 hours. Once the phases are separated, the inferior phase is filtered at reduced pressure and solvent is distilled at reduced pressure.

EXAMPLE 9

In an 8 L reactor provided by mechanical stirrer, reflux system and temperature regulator bath, 2160 g (0.8128 mol) of product of example 2, α,ω-dialkylsulfonyl ester or α,ω-diarylsulfonyl ester of poly(oxyethylene)$_w$-poly(oxypropylene)$_y$-poly(oxyethylene)$_w$ (POE$_w$-POP$_y$-POE$_w$) dissolved in 2000 mL of solvent is added, 3.2512 mol of tertiary amine at reagent-starved conditions is added, the mixture is heated at solvent boiling point at temperature between 100 to 130° C., for 7 hours. Once the phases are separated, the inferior phase is filtered at reduced pressure and solvent is distilled at reduced pressure.

What is claimed is:

1. A process to carry out a semi-industrial and industrial scale bifunctionalization with secondary or tertiary amines of a block copolymer poly(oxyethylene)$_w$-poly(oxypropylene)$_y$-poly(oxyethylene)$_w$ (POE$_w$-POP$_y$-POE$_w$) in glass-reactor with capacity between 1 and 100 , where w and y are a number in the range of 10-60, said process comprising two stages, wherein:

Stage 1 is the formation of the am-dialkylsulfonyl ester or α,ω-diarylsulfonyl ester of poly(oxyethylene)$_w$-poly(oxypropylene)$_y$-poly(oxyethylene)$_w$ (POE$_w$-POP$_y$-

$POE_w$), from a reaction of alkylsulfonyl or arylsulfonyl chloride with a triblock copolymer poly(oxyethylene)$_w$-poly(oxypropylene)$_y$-poly(oxyethylene)$_w$, ($POEw$-$POP_y$-$POE_w$), the reaction is carried out at a molar ratio of triblock copolymer $POE_w$-$POP_y$-$POE_w$/ alkylsulfonyl or arylsulfonyl chloride of 1.0/2.0 to 1.0/6.0; in the presence of a base selected from the group consisting of bicarbonates (sodium, potassium, calcium or magnesium), carbonates (sodium, potassium, calcium or magnesium), triethylamine, tripropylamine, N,N-dimethylaniline and pyridine, with a triblock copolymer $POE_w$-$POP_y$-$POE_w$/base ratio between 1.0/2.0 to 1.0/8.0 in a solvent selected from the group consisting of acetonitrile, benzonitrile, chloroform, carbon tetrachloride, 1,2-dichloroethane, chlorobenzene, dioxane, dimethylformamide, dimethylsulfoxide, dimethylether ethyleneglycol, 2-methoxyethylether or tetrahydrofurane, in a weight (grams)/volume (ml) triblock copolymer triblock $POE_w$-$POP_y POE_w$ /solvent of 1.0/1.0 to 1.0/10.0, at a reaction temperature of from 5 to 50 ° C., with a reaction time of 1 to 8 hours, the reaction product is filtered at vacuum; the solvent is not eliminated from the product;

Stage 2 is carried out the nucleophilic substitution reaction of secondary or tertiary amines with, α,ω-dialkylsulfonyl ester or α,ω-diarylsulfonyl ester of poly(oxyethylene)$_w$-poly(oxypropylene)$_y$-poly(oxyethylene)$_w$ ($POE_w$-$POP_y$-$POE_w$), wherein the synthesis of Y-$POE_w$-$POP_y$-$POE_w$-Y where Y is a secondary amine is carried out with a molar ratio of a,α,ω)-dialkylsulfonyl ester or α,ω-diarylsulfonyl ester of triblock copolymer poly(oxyethylene)$_w$-poly(oxypropylene)$_y$-poly(oxyethylene)$_w$ ($POE_w$-$POP_y$-$POE_w$)/secondary amine between 1.0/2.0 to 1.0/10.0; in a base selected from the group consisting of bicarbonates (sodium, potassium, calcium or magnesium), carbonates (sodium, potassium, calcium or magnesium), triethylamine, tripropylamine, N,N-dimethylaniline and pyridine in molar relationship regarding copolymer between 2 to 10 moles per mole of $POE_w$-$POP_y$-$POE_w$, temperature range of 30 to 100° C., a reaction time in a range of 2 to 10 hours, a solvent selected from the group consisting of acetonitrile, benzonitrile, chloroform, carbon tetrachloride, 1,2-dichloroethane, chlorobenzene, dioxane, dimethylformamide, dimethylsulfoxide, dimethylether ethyleneglycol, 2-methoxyethyl-ether and tetrahydrofurane in a weight (g)/volume (ml) ratio (w/v) of αω-dialkylsulfonyl ester or αω-diarylsulfonyl ester of triblock copolymer ($POE_w$-$POP_y$-$POE_w$)/solvent between 1.0/1.0 to 1.0/10.0, the resulting bifunctionalized with amines the triblock copolymer poly(oxyethylene)$_w$-poly(oxypropylene)$_y$-poly(oxyethylene)$_w$, the chemically modified product is filtered at reduced pressure and solvent is evaporated at reduced pressure, or the synthesis of Z-$POE_w$-$POP_y$-$POE_w$-Z where Z is a tertiary amine, the reaction is carried out with a molar ratio αω-dialkylsulfonyl ester or αω-diarylsulfonyl ester of triblock copolymer poly(oxyethylene)$_w$-poly(oxypropylene)$_y$-poly(oxyethylene)$_w$ ($POE_w$-$POP_y$-$POE_w$)/tertiary amine of 1.0/2.1 to 1.0/5.0, at a temperature between 50 to 130° C., a reaction time 7 to 17 hours, in a solvent selected from the group consisting of acetonitrile, benzonitrile, chloroform, carbon tetrachloride, 1,2-dichloroethane, chlorobenzene, dioxane, dimethylformamide, dimethylsulfoxide, dimethylether ethyleneglycol, 2methoxyethylether and tetrahydrofurane at weight/volume relationship (w/v) of αω-dialkylsulfonyl ester or αω-diarylsulfonyl ester of triblock copolymer ($POE_w$-$POP_y$-$POE_w$)/solvent between 1.0/1.0 to 1.0/15.0, the resulting bifunctionalized products with amines the triblock copolymer poly(oxyethylene)$_w$-poly(oxypropylene)$_y$-poly(oxyethylene)$_w$, the chemically modified product is filtered at reduced pressure and solvent is evaporated at reduced pressure.

2. The process for the bifunctionalization with secondary or tertiary amines of triblock copolymer poly(oxyethylene)$_w$-poly(oxypropylene)$_y$-poly(oxyethylene)$_w$ ($POE_w$-$POP_y$-$POE_w$), according to claim 1, where the triblock copolymer poly(oxyethylene)$_w$-poly(oxypropylene)$_y$-poly(oxyethylene)$_w$($POE_w$-$POP_y$-$POE_w$) has a molecular weight in number $M_n$between 600 and 10,000 g/mol.

3. The process for the bifunctionalization with secondary or tertiary amines of triblock copolymer poly(oxyethylene)$_w$-poly(oxypropylene)$_y$-poly(oxyethylene)($POE_w$-$POP_y$-$POE_w$), according to claim 2, where the alkylsulfonyl or arylsulfonyl chloride is selected from the group consisting of methanesulfonyl chloride, trichloromethanesulfonyl chloride, ethanesulfonyl chloride, 2-methoxyethane-1-sulfonyl chloride, 1-propanosulfonyl chloride, isopropylsulfonyl chloride, 3,3,3-trifluoropropane-1-sulfonyl chloride, 1-butanesulfonyl chloride, benzenesulfonyl chloride, 2-chlorobenzenesulfonyl chloride, 3 -methylbutane-1-sulfonyl chloride, 3-benzenesulfonyl chloride, cyclopentanesulfonyl chloride, 4-benzenesulfonyl chloride, para-toluenesulfonyl chloride, trifluoromethylbenzenesulfonyl chloride, nitrobenzenesulfonyl chloride, 1,4-benzodioxane-6-sulfonyl chloride, biphenyl-4-sulfonyl chloride, 4'-chlorobiphenyl-4-sulfonyl chloride, 4'-metoxybiphenyl-4-sulfonyl chloride, 4'-fluorobiphenyl-4-sulfonyl chloride, 4'-methylbiphenyl-4-sulfonyl chloride, and 4-bromobenzenesulfonyl chloride.

4. The process for bifunctionalization with secondary or tertiary amines of triblock copolymer poly(oxyethylene)$_w$-poly(oxypropylene)$_y$-poly(oxyethylene)$_w$ ($POE_w$-$POP_y$-$POE_w$), according to claim 3, where in the stage 1 the molar ratio of the triblock copolymer $POE_w$-$POP_y$-$POE_w$ to the alkylsulfonyl or arylsulfonyl chloride is between 1.0/2.2 to 1.0/4.5.

5. The process for the bifunctionalization with secondary or tertiary amines of triblock copolymer poly(oxyethylene)$_w$-poly(oxypropylene)$_y$-poly(oxyethylene)$_w$ ($POE_w$-$POP_y$-$POE_w$), according to claim 4, where in the stage 1 the alkylsulfonyl or arylsulfonyl chloride is added in reagent-starved conditions at mass flow between 1 to 50 g/min.

6. The process for bifunctionalization with secondary or tertiary amines of triblock copolymer poly(oxyethylene)$_w$-poly(oxypropylene)$_y$-poly(oxyethylene)$_w$ ($POE_w$-$POP_y$-$POE_w$), according to claim 5, where in the stage 1 the molar ratio of the base is selected from the group consisting of bicarbonates (sodium, potassium,calcium or magnesium), carbonates (sodium, potassium, calcium or magnesium), triethylamine, tripropylamine, N,N-dimethylaniline or pyridine, with triblock copolymer poly(oxyethylene)$_w$-poly(oxypropylene)$_y$-poly(oxyethylene)$_w$ is between 2.5 to 6.0 moles per mole of $POE_w$-$POP_y$-$POE_w$.

7. The process for bifunctionalization with secondary or tertiary amines of triblock copolymer poly(oxyethylene)$_w$-poly(oxypropylene)$_y$-poly(oxyethylene)$_w$ ($POE_w$-$POP_y$-$POE_w$), according to claim 6, where in the stage 1 the base is added in reagent-starved conditions at mass flow between 1 to 70 g/min.

8. The process for bifunctionalization with secondary or tertiary amines of triblock copolymer poly(oxyethylene)$_w$-poly(oxypropylene)$_y$-poly(oxyethylene)$_w$ ($POE_w$-$POP_y$-

POE$_w$), according to claim 1, where in the stage 1 the solvent is in weight (g)/volume (ml) relationship of triblock copolymer POE$_w$-POP$_y$-POE$_w$/solvent between 1.0/2.0 to 1.0/7.0.

9. The process for bifunctionalization with secondary or tertiary amines of triblock copolymer poly(oxyethylene)$_w$-poly(oxypropylene)$_y$-poly(oxyethylene)$_w$ (POE$_w$-POP$_y$-POE$_w$), according to claim 8, where in the stage 1 the reaction temperature is from 15° C. to 35° C.

10. The process for bifunctionalization with secondary or tertiary amines of triblock copolymer poly(oxyethylene)$_w$-poly(oxypropylene)$_y$-poly(oxyethylene)$_w$ (POE$_w$-POP$_y$-POE$_w$), according to claim 9, where in the stage 1 the reaction time is between 3 to 6 hours.

11. The process for bifunctionalization with secondary amines of triblock copolymer poly(oxyethylene)$_w$-poly(oxypropylene)$_y$-poly(oxyethylene)$_w$ (POE$_w$-POP$_y$-POE$_w$), according to claim 1, where in the stage 2 the secondary amine is selected from the group consisting of (2,2-dimethylpropyl)(methyl)amine, N-methyl-N-(1-pentylethyl)amine, (4 chloro-benzyl)-methylamine bis-(2-ethyhylhexyl)amine, N-benzyl-N -(2-methoxyethyl)amine, diisopropylamine, 2-(methylamine)-ethanol, 2-(butylamine) -ethanol, 2-(benzylamine)-ethanol, 2-(cyclohexylamine)-ethanol, 2-(ter-butylamine) -ethanol, 2-(phenylamine)-ethanol, 2-(n-propylamine)-ethanol, 2-(iso-propylamine) -ethanol, 2-(hydroxymethylamine)-ethanol, 2,2'-imidodiethanol,1,1'-iminodi -2-propanol, 4-(butylamine)-1-butanol, 1-benzylpiperazine, 1-phenylpiperazine, 2-(hexylamino)-ethanol, 1-acetylpiperazine, 1-(ortho-clorophenyl)-piperazine, 1-ethylpiperazine, 1-(methyl-tolyl) -piperazine, 1(4-nitrophenyl)-piperazine, 4-benzyipiperidine, 4-methylpiperidine, 2-methylpiperidine, 2-ethylpiperidine, 3,5-dimethylpiperidine, piperidine-3-ol, piperidine-4-ol, trans-3,5-dimethylpiperidine, cis-3,5-dimethylpiperidine, 3-methylpiperidine, piperidine-3-ylmethanol, 3,3-dimethylpiperidine, 4-phenylpiperidine-3-ol, 4-phenyl -piperidine, 4-(piperidine-4-il) morpholine, 4,4'-bipiperidine, pyrrolidine-3-amine, 2,6-dimethylmorpholine, morpholine, pyrrolidine-2-ylmethanol, trans-2,5-dimethylpyrrolidine, cis-2,5-dimethylpyrrolidine, diphenylamine, 2-nitro-diphenylamine, 4-nitro-diphenylamine, pyrrolidine, 4,4'-bis(dimethylamine)-diphenylamine, 2,4-dinitro -diphenylamine, 4,4'-dimethoxy-diphenylamine, diethylamine, dipropylamine, dibutylamine, dipentylamine, dihexylamine, dioctylamine, didecylamine, didodecylamine, dinonylamine, N-methyl-hexylamine, di-iso-propylamine, N-iso-propyl-tert-butylamine, N-ethyl-ter-butylamine, N-ethyl-butylamine, di-isobutylamine, iso-butyl-sec-butylamine, di-iso-pentylamine, ethyl-n-dodecylamine, di-ter-amylamine, N-methyl-pentylamine, N -methyl-butylamine, N-methyl-ter-butylamine, N-ethyl-iso-propylamine, N-ethyl-propylamine, N-methyl-octylamine, and piperidine.

12. The process for bifunctionalization with secondary amines of triblock copolymer poly(oxyethylene)$_w$-poly(oxypropylene)$_y$-poly(oxyethylene)$_w$ (POE$_w$-POP$_y$-POE$_w$), according to claim 11, where in the stage 2 the molar ration of said α,ω-dialkylsulfonyl ester or α,ω-diarylsulfonyl ester of triblock copolymer POE$_w$-POP$_y$-POE$_w$/secondary amine is between 1.0/2.5 and 1.0/8.5.

13. The process for bifunctionalization with secondary amines of triblock copolymer poly(oxyethylene)$_w$-poly(oxypropylene)$_y$-poly(oxyethylene)$_w$ (POE$_w$-POP$_y$-POE$_w$), according to claim 1, where in the stage 2 the base is selected from the group consisting of bicarbonates (sodium, potassium, calcium or magnesium), carbonates (sodium, potassium, calcium or magnesium), triethylamine, tripropylamine, N,N-dimethylaniline or pyridine, in a molar ratio of α,ω-dialkylsulfonyl ester or αω-diarylsulfonyl ester of triblock copolymer POE$_w$-POP$_y$-POE$_w$ between 3.0 and 6.5 moles.

14. The process for bifunctionalization with secondary amines of triblock copolymer poly(oxyethylene)$_w$-poly(oxypropylene)$_y$-poly(oxyethylene)$_w$ (POE$_w$-POP$_y$-POE$_w$), according to claim 13, where in the stage 2 a base is included in an excess of the amine for the nucleophilic substitution reaction and the secondary amine is in a molar excess of α,ω-dialkylsulfanyl ester or α,ω-diarylsulfonyl ester of triblock copolymer POE$_w$-POP$_y$-POE$_w$ between 3 and 10 moles.

15. The process for bifunctionalization with secondary amines of triblock copolymer poly(oxyethylene)$_w$-poly(oxypropylene)$_y$-poly(oxyethylene)$_w$ (POE$_w$-POP$_y$-POE$_w$), according to claim 14, where in the stage 2 the base or excess of amine is added in reagent-starved conditions at mass flow between 1 and 70 g/min.

16. The process for bifunctionalization with secondary amines of triblock copolymer poly(oxyethylene)$_w$-poly(oxypropylene)$_{y\text{-}poly(oxyethylene)w}$(POE$_w$ $_{\text{-}POPy}$-POE$_w$) according to claim 1,where in the stage 2 the weight (g)/volume (ml) ratio of α,ω-dialkylsulfonyl ester or α,ω-diarylsulfonyl ester of triblock copolymer POE$_w$-POP$_y$-POE$_w$/solvent is between 1.0/1.0 and 1.0/10.0.

17. The process for bifunctionalization with secondary amines of triblock copolymer poly(oxyethylene)$_w$-poly(oxypropylene)$_y$-poly(oxyethylene)$_w$ (POE$_w$-POP$_y$-POE$_w$), according to claim 16, where in the stage 2 the reaction is carried out at temperature of 35 to 85° C.

18. The process for bifunctionalization with secondary amines of triblock copolymer poly(oxyethylene)$_w$-poly(oxypropylene)$_y$-poly(oxyethylene)$_w$ (POE$_w$-POP$_y$-POE$_w$), according to claim 17, where in the stage 2 the reaction times are in range of 3 to 8 hours.

19. The process for bifunctionalization with tertiary amines of triblock copolymer poly(oxyethylene)$_w$-poly(oxypropylene)$_y$-poly(oxyethylene)$_w$ (POE$_w$-POP$_y$-POE$_w$), according to claim 1, where in the stage 2 the tertiary amines are selected from the group consisting of dibutylhexadecylamine, triisooctylamine, trioctylamine, 2-ethyl-N,N-bis(2-ethylhexyl)-hexylamine, dimethyl-docosyl-amine, N,N-dimethylhexadecylamine, trihexylamine, 1-benzyl-1H-imidazole, 1-methyl-1H-imidazole, 1-phenyl-1H-imidazole, 1-butyl-1H-imidazole, 1-vinyl-1H-imidazole, 1-ethyl-1H-imidazole, 1-lauryl-1H -imidazole, 1-cyano-1H-imidazole, 1-hexyl-1H-imidazole, 1-propyl-1H-imidazole, 1-benzyloxy-1H-imidazole, 1-ethoxy-1H-imidazole, 1-methoxy-1H-imidazole, 1-methoxymethyl-1H-imidazole, 1-benzydryl-1H-imidazole, 1-(diethoxymethyl)-1H -imidazole, 1-(triphenylmethyl)-1H-imidazole, 1-(2-methyl-phenyl)-isoquinoline, 1-(4-methyl-phenyl)-isoquinoline,1-(4-phenyl-phenyl)-isoquinoline, 3-(4-methoxy-phenyl) -isoquinoline, 3-(4-piperazinyl)-isoquinoline, 3-nitro-isoquinoline, 4-bromo-isoquinoline, 4-phenyl-sulfanyl-isoquinoline, 4-methyl-sulfanyl-isoquinoline, 5-nitro-isoquinoline, 5-bromo-isoquinoline, 6-bromo-isoquinoline, 7-octyloxy-isoquinoline, 5,8-dibromo -isoquinoline, quinoline, 8-(2-phenoxy-ethoxy)-quinoline, 2,8-dimethyl-quinoline, 3-nitroquinoline, 3-(3-methyl-phenyl)-quinoline, 3-(2-methyl-phenyl)-quinoline, -3-(4-methoxy-phenyl)-quinoline, 3-(3-methoxy-phenyl)-quinoline, 3-(2-methoxy-phenyl) -quinoline, 2-(benzyloxy)-quinoline, 2-(4-methyl-phenyl)-quinoline, 2-(2-methoxy -phenyl)-quinoline, 8-(4-nitro-phenoxy)-quinoline, 8-(4-phenoxy-butoxy)-quinoline,2,8-dimethyl-quinoline, 3,4-dimethyl-pyridine, 4-(4-nitro-phenyl)- pyridine, 3-(4-bromo-phenyl)-pyridine,3-(4-nitro-phenyl)-pyridine, and 4-(cyclohexyl-methyl)-pyridine.

20. The process for bifunctionalization with tertiary amines of triblock copolymer poly(oxyethylene)$_w$-poly(oxypropylene)$_y$-poly(oxyethylene)$_w$ (POE$_w$-POP$_y$-POE$_w$), according to claim 1, where in the stage 2 the molar relationship of α,ω-dialkylsulfonyl ester or α,ω-diarylsulfonyl ester of triblock copolymer POE$_w$-POP$_y$-POE$_w$/tertiary amine is between 1.0/2.2 and 1.0/4.5.

21. The process for bifunctionalization with secondary or tertiary amines of triblock copolymer poly(oxyethylene)$_w$-poly(oxypropylene)$_y$-poly(oxyethylene)$_w$ (POE$_w$-POP$_y$-POE$_w$), according to claim 1, where in the stage 2 the amine is added at reagent-starved conditions at mass flow between 1 and 60 g/min.

22. The process for bifunctionalization with tertiary amines of triblock copolymer poly(oxyethylene)$_w$-poly(oxypropylene)$_y$-poly(oxyethylene)$_w$ (POE$_w$-POP$_y$-POE$_w$), according to claim 1, where in the stage 2 the weight (g)/volume relationship (ml) ratio of α,ω-dialkylsulfonyl ester or α,ω-diarylsulfonyl ester of triblock copolymer POE$_w$-POP$_y$-POE$_w$/solvent is between 1.0/2.0 and 1.0/7.0.

23. The process for bifunctionalization with tertiary amines of triblock copolymer poly(oxyethylene)$_w$-poly(oxypropylene)$_y$-poly(oxyethylene)$_w$ (POE$_w$-POP$_y$-POE$_w$), according to claim 22, where in the stage 2 the reaction is carried out at temperature of 60 to 110° C.

24. The process for bifunctionalization with tertiary amines of triblock copolymer poly(oxyethylene)$_w$-poly(oxypropylene)$_y$-poly(oxyethylene)$_w$ (POE$_w$-POP$_y$-POE$_w$), according to claim 23, where in the stage 2 the reaction times are in the range between 9 and 15 hours.

* * * * *